United States Patent

Roehr

[11] Patent Number: 4,457,295
[45] Date of Patent: Jul. 3, 1984

[54] WARMING GARMENT FOR HEATING PEOPLE

[76] Inventor: Oskar W. K. Roehr, Windmühlenstieg 15, 2000 Hamburg 52, Fed. Rep. of Germany

[21] Appl. No.: 377,941

[22] Filed: Jun. 4, 1982

[30] Foreign Application Priority Data

May 29, 1981 [DE] Fed. Rep. of Germany ....... 3121247

[51] Int. Cl.³ ............................................... A61F 7/00
[52] U.S. Cl. ..................................... 126/204; 165/46; 2/2
[58] Field of Search ............ 237/1 R, 12.3 R, 12.3 A; 126/204; 2/2, 2.1 A, 2.1 R; 165/46

[56] References Cited

U.S. PATENT DOCUMENTS 3,468,299 9/1969 D'Amato ............................ 126/204
3,892,225 7/1975 Twose ................................. 126/204

FOREIGN PATENT DOCUMENTS 1369902 9/1963 France .......................... 237/12.3 R Primary Examiner—Albert J. Makay
Assistant Examiner—Henry Bennett
Attorney, Agent, or Firm—Toren, McGeady and Stanger

[57] ABSTRACT

The invention relates to an apparatus for heating people, particularly those travelling on motor cycles or in motor vehicles, such as open motor vehicles, or watercraft, tracked vehicles or working vehicles having internal combustion engines, or working on ocean-going ships, floating drilling platforms, etc, in which a hot air producing apparatus supplied with the waste heat of an internal combustion engine comprising a heat exchanger whose casing tube surrounds the exhaust pipe portion of the internal combustion engine and having a cold air inlet and a hot air outlet connection with a meterable cold air supply, is connected by means of a flexible hose connection to the inner area of a double-layer article of clothing, to which is supplied by means of a blower the hot air produced by the heat exchanger and which on the side facing the person wearing the clothing is provided with hot air outlets.

10 Claims, 5 Drawing Figures

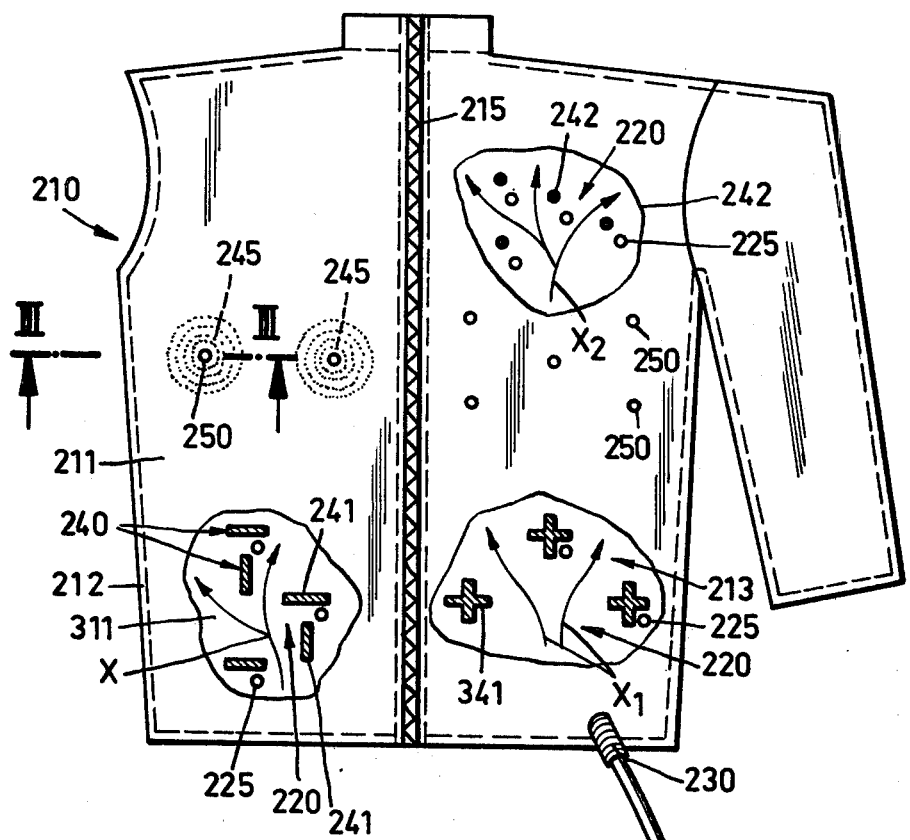
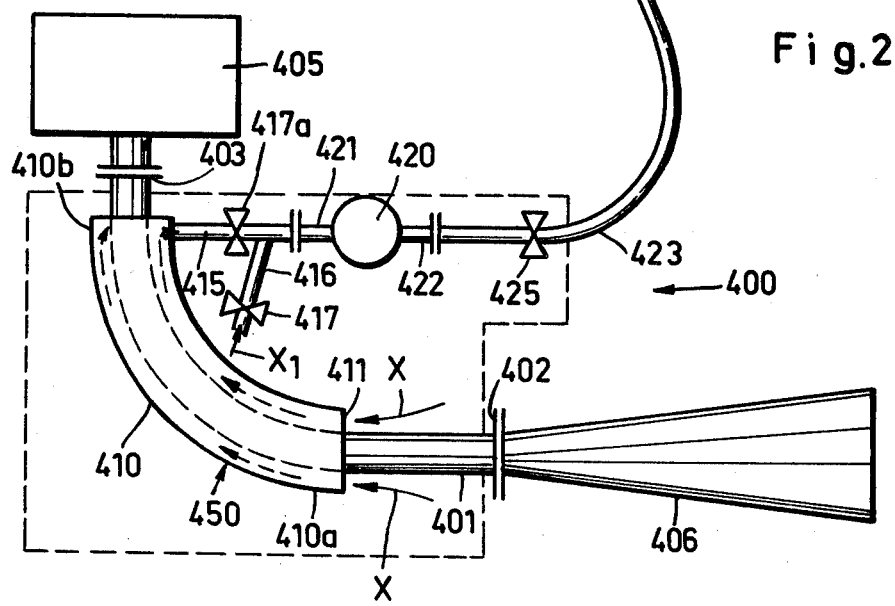
Fig.2

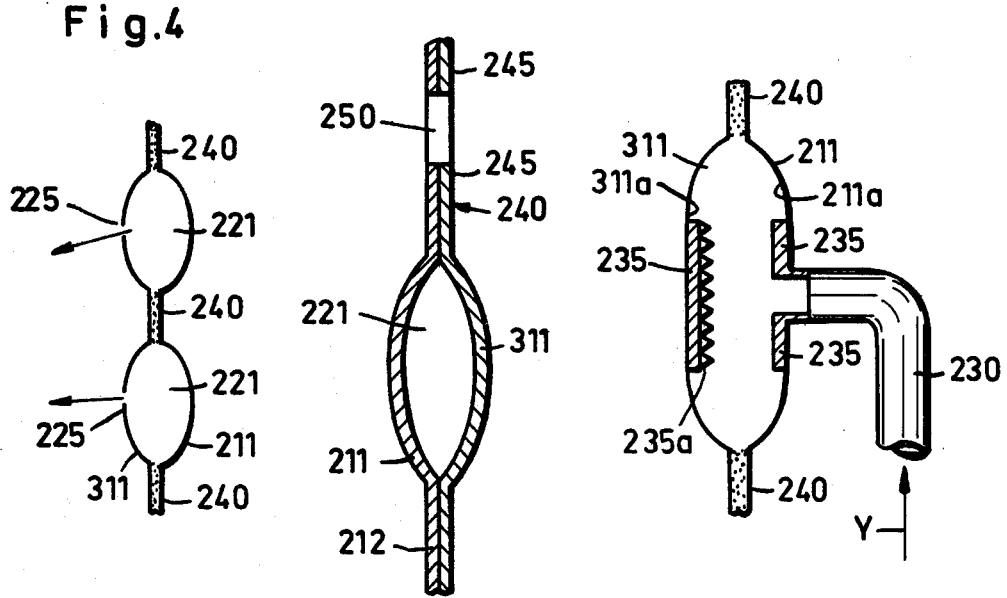

WARMING GARMENT FOR HEATING PEOPLE

BACKGROUND OF THE INVENTION

The invention relates to an apparatus for heating people, particularly those travelling on motor cycles or in motor vehicles, such as open motor vehicles, or watercraft, tracked vehicles or working vehicles having internal combustion engines, or working on ocean-going stips, floating drilling platforms, etc.

When driving motor cycles and open motor vehicles, the disadvantage exists that the persons concerned are exposed to the slip stream, so that there is a risk to the health as a result of undercooling. To prevent this, such persons wear special clothing, which completely cover the body and are impermeable or inpenetratable for the wind. However, the disadvantage then exists that due to the air-impermeable shielding of the body surface, it is no longer possible for there to be a moisture exchange from the skin to the ambient. As a result, moisture accumulates, which after travelling for a relatively short time causes a partial wetting of the clothing between the body surface and the wind-impermeable clothing, which can be the cause of colds and chills, quite apart from being unpleasant for the wearer.

In addition, it is particularly the chest and back of the travelling person which is cooled first, so that this can in particular lead to damage and illnesses to the respiratory tracts, the lungs and the kidneys. The close-fitting protective clothing, particularly worn by motor cyclists do not permit an adequate circulation of air between the wearer and the article of clothing, which can lead to the wearer's concentration being impaired as a result of it being necessary to interrupt the journey at ever more frequent intervals in order to freshen up through opening the clothing.

The most varied designs of protective clothing for persons working e.g. in the open and in winter are known. Thus, an article of protective clothing is known to which are fixed heat-transferring hoses through which flow a liquid and applied in the form of coils, in which the hoses are individually or in grouped manner held in freely movable manner in holding means comprising ducts. Due to the fact that the hoses can move freely in the holding means and, as a result of the coiled arrangement of the hoses, the complete hose system can move in concertina-like manner during movements of the wearer, the wearer of such clothing is supposed to have the maximum possible freedom of movement (DOS No. 1,610,647).

In addition, a heatable, cloth-like product, as well as a heatable suit made from such a product is known, which is constructed in such a way that woven areas are separated from one another by woven-in longitudinal portions of flexible hoses or tubes for carrying a fluid heat carrier. The tubes extend exclusively in one direction of the woven product and individual yarns or threads or groups of yarns or threads run at right angles over the tubes alternately on the top and the bottom of the product. The tubes extend in the direction of the warp threads, which are comparatively inextensible, whereas the weft threads are comparatively highly extensible. Since, as a result of the special construction of this known product from which the suit is formed, the tubes or hoses engage closely with the wearer's body, there is supposed to be a direct heat transfer from the circulating heat carrier to the torso by heat conduction. Such a suit is particularly intended for use as underclothing in a swim or diving suit (DOS No. 1,908,742).

However, all these known protective clothings are complicated and costly to manufacture. When worn, they can in part impair or impede the working movement of the person to be heated.

BRIEF SUMMARY OF THE INVENTION

The problem of the present invention is to obviate this disadvantage. The invention solves the problem of providing an apparatus with which it is possible to heat the body, particularly specific parts of the body such as the back and chest, of a motor cyclist, persons sitting in vehicles or working in arctic ocean areas on ships, drilling platforms and the like and which is easy and inexpensive to manufacture. It is simultaneously ensured that it is effortlessly possible to install the hot air producing apparatus in existing exhaust systems of an internal combustion engine using untrained persons and this can also take place at a subsequent time.

According to the invention, this problem is solved by an apparatus for heating people, particularly those travelling on motor cycles or in motor vehicles, such as open motor vehicles, or watercraft, tracked vehicles or working vehicles having internal combustion engines, or working on ocean-going ships, floating drilling platforms, etc, which (a) comprises a hot air producing apparatus supplied by the waste heat from an internal combustion engine, which is constituted by a curved or straight exhaust pipe portion with connecting devices constructed at both ends and with a heat exchanger from the casing surrounding the exhaust pipe portion, which is provided at one end with a cold air inlet and which has at its end a hot air outlet connection into which issues a cold air suction connection and which is connected to the suction connection of a blower, whose pressure connection is provided with a regulating valve and carries the flexible clothing connecting hose, and (b) and an article of clothing such as a jacket, parka, overall, coat, etc, having a hot air-carrying duct system comprising a plurality of air ducts with air inlets on the side facing the person carrying the article of clothing and air outlets, as well as a flexible line connected to the hot air producing apparatus and which is constructed in double-layer form, the two layers of the article of clothing being zonally interconnected for forming the air ducts and made from air-impermeable, thermally stable material, particularly plastic sheeting.

The invention also relates to an apparatus for heating people, particularly those travelling on motor cycles or in motor vehicles, such as open motor vehicles, or watercraft, tracked vehicles or working vehicles having internal combustion engines, or working on ocean-going ships, floating drilling platforms, etc, which comprises (a) a hot air producing apparatus supplied by the waste heat from an internal combustion engine, which is constituted by a curved or straight exhaust pipe portion with connecting devices constructed at both ends and with a heat exchanger from the casing surrounding the exhaust pipe portion, which is provided at one end with a cold air inlet and which has at its end a hot air outlet connection into which issues a cold air suction connection and which is connected to the suction connection of a blower, whose pressure connection is provided with a regulating valve and carries the flexible clothing connecting hose, and (b) an article of clothing such as a jacket, parka, overall, coat, etc, which is constructed in a doublelayer manner and comprises an inner layer and an outer layer of weldable plastic sheeting or a fabric backed by plastic sheeting, the two layers being welded together at the edge, whilst forming a closed inner area and whilst forming a hot air-carrying duct system constituted by a plurality of interconnected air duct-like portions in its inner area and are welded together zonally or in punctiform manner, and one of the two layers is connected to a hot air supply connection issuing into the inner area and the inner layer of the clothing facing the clothing wearer has air outlets.

Thus, an article of clothing is provided, which permits a hot air distribution on the parts of the body of the clothing wearer covered by the article of clothing, which does not inflate greatly through the introduction or blowing in of hot air and which still permits an interruption of the hot air supply in the inner area of the clothing when portions of the latter are compressed when sitting, so that the hot air supply within the clothing to other air outlets is in no way impaired.

The special construction of the hot air-carrying duct system in the inner area of the clothing on the one hand prevents a natural inflation of the clothing on blowing in or forcing in hot air. On the other hand, the zonally arranged welds interconnecting the inner and outer layers give the article of clothing a certain strength and durability. The air outlets are provided in the layer of clothing, which faces the body of the person wearing it, so that the hot air escaping from the inner area of the clothing contributes to a uniform heating of the parts of the body covered with the clothing.

The invention also provides an embodiment in which continuous openings are provided in the connecting areas of the welded portions for the two layers of the clothing, whilst maintaining closed circular welds, so that there can be no moisture accumulation in the space between the worn clothing and the wearer's body. The arrangement of the air outlets adjacent to or in the vicinity of the welds interconnecting in a zonal manner the two layers of the article of clothing also leads to the advantage that these welded portions to a certain extent reinforce and stabilize the adjacent area, so that the air outlets cannot be closed by the displacement of the inner layer of clothing. In addition, a hot air producing apparatus constructed according to the invention, together with the article of clothing constitutes a constructional unit, which can be effortlessly incorporated into existing exhaust systems of internal combustion engines and which can also be integrated into the exhaust system at the time of the initial construction. For installation purposes, it is merely necessary to disassemble the existing exhaust elbow or pipe and replace it by the bent or straight exhaust pipe portion with the hot air producing apparatus. Due to the fact that the hot air producing apparatus according to the invention has a suction - pressure blower connected downstream of the heat exchanger and the cold air suction connection, it is possible to bring about a completely satisfactory regulation of the hot air to be supplied to the clothing and the temperature of the hot air supplied to the clothing can be controlled, so that any overheating within the clothing is impossible. If between the heat exchanger and the cold air inlet a shut-off valve is additionally provided upstream of the blower, the clothing wearer has the possibility of supplying only cold air to the article of clothing via the blower, if this should be desired.

The advantages resulting from the invention are essentially that persons working in the open and particularly at temperatures below 0° C., or who are travelling in open vehicles and are particularly exposed to the cold slip stream, receive body heating, so as to avoid the aforementioned unpleasant effects. In addition, the article of clothing is not unnaturally inflated on introducing the hot air. On sitting or squeezing individual portions of the clothing, the hot air supply to the remaining portions thereof is not interrupted.

Further advantageous developments of the invention can be gathered from the subclaims.

BRIEF DESCRIPTION OF THE DRAWINGS

The invention is described in greater detail hereinafter relative to non-limitative embodiments and the attached drawings, wherein show:

FIG. 2 a diagrammatic view of the complete apparatus for heating persons with a differently constructed article of clothing.

FIG. 3 a larger scale, horizontal section along line III-13 III of FIG. 2.

FIG. 4 a diagrammatic view of a portion of the article of clothing with two air duct-like portions and the air outlet openings.

FIG. 5 partly in elevation and partly in vertical section, the hot air supply connection connected to the article of clothing.

DETAILED DESCRIPTION OF THE PREFERRED EMBODIMENTS

Figure 1:
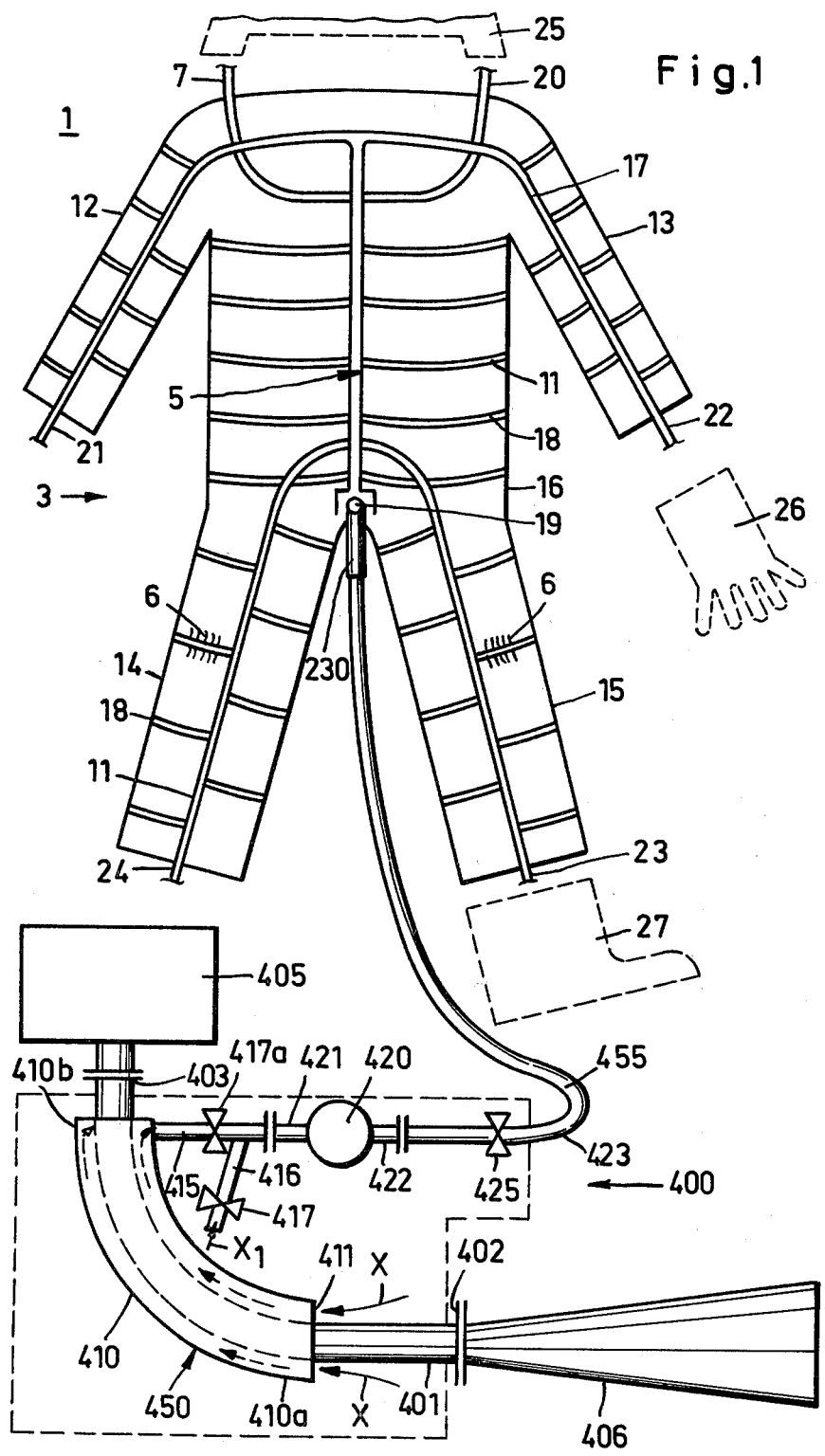
FIG. 1 a diagrammatic view of the overall apparatus for heating persons comprising an article of clothing and a hot air producing apparatus.

The complete apparatus for heating persons comprises a hot air producing apparatus 400 and an article of clothing 3 or 210 connected thereto and into which can be introduced the hot air produced in apparatus 400.

The hot air producing apparatus 400 shown in FIGS. 1 and 2 comprises a bent or straight exhaust pipe portion 401, provided at both ends with connecting devices 402, 403, by means of which portion 401 can be connected to the exhaust outlet connection on the engine side and to the exhaust silencer or muffler 406. In the drawing, the engine is diagrammatically indicated at 405.

On the exhaust pipe portion 401, is provided a heat exchanger 450, constructed in per se known manner and whose casing tube 410 surrounds the exhaust pipe portion 401. At its end 410a opposite to the exhaust muffler 406, heat exchanger 450 has a cold air inlet 411 via which cold air can be drawn in in the direction of arrow X. In the vicinity of the upper end 410b, heat exchanger 450 has a hot air outlet connection 415 through which the heated air flowing through heat exchanger 450 can be supplied to the article of clothing 3 or 210 by means of the following blower 420. In the supply line from heat exchanger 450 to blower 420 is provided a cold air suction connection 416 which, with a valve 417, is used for regulating the quantity of cold air sucked in in the direction of arrow X1. The hot air outlet connection 415 of heat exchanger 450 is connected to the blower suction connection 421. The blower pressure connection 422 is connected to a pipe section 423 in which is arranged a pressure regulating valve 425. A flexible connecting hose 455 is connected to pipe section 423 and is connected to article of clothing 3 or 210 into which the hot air is introduced for heating purposes. Clothing 3 or 210 is constructed in jacket-like or sleeveless manner, but can also be provided with sleeves. At the front, the clothing is closed by means of a zip fastener, but it is also possible to use other connecting means such as button strips, press button strips, etc.

A duct system 5 is integrated into the clothing 3 shown in FIG. 1. Duct system 5 is connected by flexible line 455 to the hot air producing apparatus 400. Flexible line 455 of hot air producing apparatus 400 is fixed to a connecting piece 230 provided on the clothing side and which is connected to duct system 5 of clothing 3.

In clothing 3 is provided a main duct 17 extending from the connecting piece 19 through central part 16 as well as arm parts 12, 13 and leg parts 14, 15 of clothing 3. Approximately at right angles to main duct 17 distribution ducts 18 are arranged in spaced manner to one another and have air passage ports 16 aligned with the body of the person wearing clothing 3.

Clothing 3 also carries connecting pieces 20, 21, 22, 23, 24 used for connecting duct system 5 to a helmet 25, gloves 26 and boots 27. The connection can take place by not further shown short, flexible line portions.

In clothing 3, the duct system 5 can be constructed in several different ways. Thus, it is possible to produce the clothing free from an outer and an inner layer, both layers being zonally interconnected, accompanied by the formation of air ducts. The connecting webs arranged between the layers can have different spacings from one another. It is also possible to construct the duct system 5 in hose-like manner on the inside of clothing 3. The air supplied to clothing 3 escapes by means of air outlets 7.

The article of clothing 210 shown in FIG. 2 is constructed in jacket-like manner and can be sleeveless or have sleeves. At the front, the article of clothing is closed by means of the zip fastener 215.

Clothing 210 is constructed in a two-layer manner and comprises outer layer 211 and the inner layer 311, the latter constituting the side facing the wearer's body. The two layers 211, 311 are made from weldable plastic sheeting or a fabric lined with such plastic sheeting.

The two layers 211, 311 are edge-welded, accompanied by the formation of a closed inner area 213. In inner area 213 is formed a hot air-carrying duct system 220, comprising a plurality of interconnected air duct-like portions 221. These air duct-like and joined portions 221 are formed by a zonal or punctiform welding of the two layers 211, 311. As the two layers 221, 311 of clothing 210 are made from a weldable plastic sheeting of a fabric lined with such sheeting, there is no problem in zonally welding together the two layers 211, 311. The welded portions 240 are provided in such a way that a continuous hot air-carrying duct system 220 is formed. The zonal welding together of the two layers 211, 311 of clothing 210 can take place in punctiform or spot manner, as indicated at 242 in FIG. 2. These spot-like welds are then formed in an approximately column-like manner. However, FIG. 2 shows differently constructed welded portions 240, which are e.g. in the form of webs and are indicated at 241. These web-like welded portions 240 are displaced relative to one another, so that the air passed through the inner area 213 of clothing 210 can flow in the direction of arrows X, X1 and X2. However, the welding webs 240 can also be constructed in cross-like manner, as indicated in FIG. 2 at 341. Here again, there is advantageously a displaced arrangement and association of the cross-webs.

Hot air is supplied to the inner area 213 of clothing 210 by means of a hot air supply connection 230 to which is connected the flexible hose line 455 of the hot air producing apparatus 400. The connection of the hot air supply connection 230 to one of the two layers 211, 311 of article of clothing 210 is illustrated in FIG. 5. In this case, connection 230 is connected to the inner area 213 of clothing 210 in the vicinity of its outer layer 211. However, it is also possible to connect to the inner layer 311 of the clothing. Hot air is supplied through the hot air supply connection 230 in the direction of arrow Y (FIG. 5).

To prevent excessive heating of the plastic sheeting layer facing the hot air supply connection area in the region where the hot air flows into the inner area 213 of clothing 210, not only does the inner wall surface of layer 311 have an insulating coating 235, but also an insulating coating 35 is provided on the inner wall surface of the outer layer 211 in the connecting area 211a of supply connection 230 (FIG. 5). These insulating coatings 235 can be constructed in such a way that they simultaneously have a stiffening action, so as to avoid compression of the facing wall surfaces of the two layers 211, 311 in the connecting area 211a of the hot air supply connection 230 and as a result the hot air supply is not impeded in such situations. To maintain the spacing of the two wall surfaces of the layers 211, 311, one of the two insulating coatings can be provided with a separating profiling 235a, so that even on compressing the layers 211, 311 a flow of hot air from the hot air supply connection 230 into the inner area of 213 of clothing 210 is ensured.

In order to be able to supply the hot air supply to the inner area 213 of clothing 210 to the parts of the body of the wearer covered by said clothing, inner layer 311 of clothing 210 has in the vicinity of the air duct-like portions 221 air outlets 225, which are distributed over the entire surface of layer 311. So as to in no way reduce the air outlet through air outlets 224, the latter are provided adjacent to or in the vicinity of welded portions 240, which can also be constructed as reinforcing webs (FIG. 4).

To permit an air balance between the parts of the body to be heated and the worn clothing 210 with the external air, according to another embodiment represented in FIGS. 2 and 3, openings 250 are provided in the connecting areas of welded portions 240, which are constructed in such a way that closed, circular welds 245 remain adjacent to the individual openings 250, so that the action of the welded portions 240 is maintained, whilst simultaneously forming venting and ventilation openings, so that there is no accumulation of moisture in the inner area between the clothing and the body.

In the case of the article of clothing 210, the double layer effect extends over the entirety of the latter and this also applies to any arm and leg portions provided. An inflation effect is prevented by welded portions 240 and 241 or 242, which interconnect the two sheets of the inner and outer layers 211 and 311 of the clothing. The hot air blown into the inner area 213 of clothing 210 can propagate over the entire inner area 213, despite the said welded portions 240. As a result of the air outlets 225 provided, said air can heat the parts of the body covered with clothing 210, the arrangement and association of the welded portions 240 interconnecting layers 211, 311 is such that the individual portions of clothing 210 cannot inflate in balloon-like manner on blowing in the hot air.

The material used for producing the clothing 210 is impermeable to air and water-tight. Perspiration on the part of the clothing wearer is reduced or completely avoided by the hot air supplied to the body and the removal by means of openings 250. When the air supply is stopped, e.g. at the end of the wearer's journey, perspiration could occur, but this is prevented by the openings 250. Even if this special clothing is worn under the normal clothing, openings 250 lead to an air balance, temperature balance and air circulation. The openings 250 provided in welded portions 240 can be either circular or rectangular. In this way, the welded portions are correspondingly constructed, so that adjacent to each opening 250 a circular weld 245 is maintained.

An article of clothing 210 constructed in this way can be manufactured very inexpensively, because it only consists of two zonally interconnected plastic sheets and there is no need for an additional heat-insulating material, such as a lining or the like. The hot air-carrying duct system 220 still remains operational if parts of the duct system are squeezed, e.g. when using the clothing when sitting on a chair with a back. The air supply to the inner area 213 of clothing 210 is then interrupted in the squeezed zones, but the further hot air supply to the remaining parts of the inner areas 213 is not impaired.

If the article of clothing 210 is constructed as an inner part, it can be provided with connecting devices not shown in the drawing in order to be able to fix the inner part, e.g. in inside lining-like manner to an article of clothing such as a jacket, parka, coat, etc. The fixing device can be constituted by a press button system or zip fasteners or other suitable connecting means.

In the same way as clothing 210, the inner part can be provided with sleeves, which are then constructed in the same way as the clothing 210.

As the hot air flowing in under a slight pressure inflates the duct system, such an "inflated" article of clothing can simultaneously protect the wearer, e.g. if he has an accident with his motor cycle.

What is claimed is:

1. A warming garment particularly suitable for use by motorcycle operators including an air carrying system constructed with air outlet openings facing the body of a wearer, and consisting of air impermeable material constructed in two layers consisting of an inner layer and an outer layer, said layers being connected with one another in sections to form air carrying ducts, said air carrying system being connected to a hot air feeding hose, said garment comprising:
   weld means connecting said two layers together at selected locations thereon to form said air carrying ducts as a continuous duct network having a plurality of air outlet openings, said air outlet openings facing the body and being adjacent in the inner layer;
   means connecting said hot air feed hose with said duct-network opening into the space between said two layers at one of the outer or inner layer with insulating coatings being provided at the opposite wall surface of the other layer in the area where said hot air feed hose is connected to said one layer at the wall surfaces of the other layer which faces said one layer;
   said layers being provided in the connection area and in the hot air inlet area of the hot air feed hose with a reinforcing foil;
   said garment being combined with a hot air producing device which consists of a bent or straight pipe line section with connecting devices at both sides and with a heat exchanger of a casing tube which surrounds said pipe line section, said casing tube being provided at one side with a cold air inlet opening and having at its other end a hot air outlet nozzle into which a cold air suction nozzle provided with a shutoff valve opens, said hot air outlet nozzle being connected to the suction nozzle of a blower whose pressure connection is provided with a control valve and being connected with a flexible hose of said garment.

2. An article of clothing according to claim 1 wherein in the connecting areas of said weld means between said two layers perforations are provided which are surrounded by closed, annular welded areas.

3. An apparatus according to claim 1 or 2, wherein the cold air suction connection is provided with a regulating valve.

4. An apparatus according to claim 1, wherein a shutoff valve is arranged in the pipe section between the heat exchanger and the cold air suction connection.

5. An apparatus according to claim 2, wherein the welded portions connecting the two layers are constructed in web-like or column-like manner for forming the air duct-like sections in the inner area of the article of clothing.

6. An apparatus according to claim 2, wherein the web-like or column-like welded portions of the article of clothing are constructed as reinforcing webs.

7. An apparatus according to claim 2, wherein the air outlet in the inner area of the article of clothing is provided adjacent to or in the vicinity of the welded portions.

8. An apparatus according to claim 2, wherein in the fastening area of the hot air supply connection to the outer or inner layer of the article of clothing and specifically to the in each case facing wall surface of the in each case other layer and in the hot air supply connection area, insulating coatings are provided on the facing wall surfaces of the layers.

9. An apparatus according to claim 2, wherein the layers are provided with a reinforcing sheet in the connection and hot air entry area of the hot air supply connection.

10. An apparatus according to claim 2, wherein openings are provided in the connecting areas of the welded portions for the two layers, whilst maintaining closed, circular welds.

* * * * *